United States Patent [19]

Shibayama et al.

[11] Patent Number: 5,198,791
[45] Date of Patent: Mar. 30, 1993

[54] SURGE ABSORBER

[75] Inventors: Takashi Shibayama; Kazuyuki Arai; Fujio Ikeda, all of Saitama, Japan

[73] Assignee: Mitsubishi Materials Corporation, Tokyo, Japan

[21] Appl. No.: 829,420

[22] Filed: Feb. 3, 1992

[30] Foreign Application Priority Data

Feb. 5, 1991 [JP] Japan ................................ 3-35524

[51] Int. Cl.⁵ .................... H01H 83/10; H02H 1/00
[52] U.S. Cl. ...................................... 337/31; 337/15; 337/163; 361/124
[58] Field of Search ................... 337/14–20, 337/28–34, 1–4, 163–165; 361/54–59, 124–129, 104–111

[56] References Cited

U.S. PATENT DOCUMENTS 3,735,312  5/1973  Nagel ...................... 337/15
4,288,833  9/1981  Howell .................... 361/24

Primary Examiner—Harold Broome
Attorney, Agent, or Firm—McAulay Fisher Nissen Goldberg & Kiel

[57] ABSTRACT

The surge absorber having a surge absorbing element, and first and second wire means for electrically connecting the surge absorbing element across the input lines of an electronic device. The first and second wire means are connected to the surge absorber by conductive heat releasable means, for example, a low melting point solder. The second wire means includes a spring loaded member such that, on release of the first or second wire means by the first or second heat releasable means, respectively, by melting of the solder due to heat generated by the surge absorbing element, the surge absorbing element moves away from the first or second wire means. The surge absorber prevents an abnormal heating of the surge absorbing element when continuous overvoltages or overcurrents pass therethrough.

4 Claims, 3 Drawing Sheets

SURGE ABSORBER

BACKGROUND OF THE INVENTION

I. Field of the Invention

This invention relates to a surge absorber suitable for protecting electronic devices used for communication equipment, such as, facsimiles, telephone switchboards, modems, and the like, from surge voltages and continuous overvoltages or overcurrents. More particularly, it relates to a surge absorber which includes a surge absorbing element used for protecting the electronic devices from surge voltages and wire means for preventing abnormal and deleterious heating of the surge absorbing element when continuous overvoltages or overcurrents flow to the surge absorber.

II. Description of the Related Art

In the prior art, a conventional surge absorbing element, e.g., a gas charge tube, is parallel connected to an electronic device to be protected via a pair of input lines of the electronic device, and is designed to operate at a higher voltage than the operating voltage of the electronic device. Such a prior art surge absorbing element is a resistor having a high resistance when the voltage applied thereto is lower than the discharge voltage thereof and a resistance tens of ohms lower when the voltage applied thereto is higher than the discharge starting voltage thereof. Accordingly, when surge voltages, such as, lightning surges, etc., are instantaneously applied to an electronic circuit including the surge absorbing element and the electronic device, the surge absorbing element discharges to suppress the surge voltages, and serves to protect the electronic device from the surge voltages. However, when an overvoltage or overcurrent due to an accident, etc., is continuously applied to the electronic circuit, a certain amount of current continuously flows through the surge absorbing element. This results in the surge absorbing element being heated to high temperatures. The heat radiating from the surge absorbing element can cause the protected electronic device, as well as other electronic devices surrounding the surge absorbing element to catch fire.

A typical example would be an accident wherein the input lines of the electronic device contact the power lines thereof. While it does not usually happen that such overvoltages or overcurrents resulting from such accidents are continuously applied to the surge absorbing element, to achieve maximum safety, it has recently become desirable to take additional safety measures to avoid such accidental problems and fires caused thereby. An example of such maximum safety measures are those prescribed by Underwriter's Laboratories, Inc. of the U.S.A (UL) which requires a safety standard for surge absorbing elements so that they do not cause fire or electrical shock in communication equipment surrounding the surge absorbing element when continuous overvoltages or overcurrents are applied.

Japanese laid open patent application No. S63-18923 discloses a surge absorber which passes these safety standards. The disclosed surge absorber can prevent the abnormal heating of a surge absorbing element due to continuous overvoltages or overcurrents and thereby prevent electronic devices located close to the surge absorber from catching fire. This prior art surge absorber disclosed in this patent application is depicted in FIG. 4 and is composed of a surge absorbing element and a metal wire of a low melting point metal adhered to a surface of the surge absorbing element. The wire is electrically series connected to the surge absorbing element. As shown, surge absorber 40 has two lead pins 42 and 43 which pierce through an insulating base plate 41 of flameproof resin, e.g., polybutylene terephthalate. One end of lead pin 42 is welded to one end of a low melting point 0.25 mm diameter metal wire 49. One end of lead pin 43 is welded to a lead wire 17 of a surge absorbing element 14. The other end of the low melting point metal wire 49 is soldered to a lead wire 16 of surge absorbing element 14 by solder 28. Cylindrical glass 50 having an outer diameter of 5 mm, an inner diameter of 3.5 mm and a length of 10 mm is attached to base plate 41 to encase the surge absorbing element 14 and the low melting point metal wire 49. A casing or housing 45 of the same material as base plate 41 is further attached to the base plate 41. The respective other ends of the two lead pins 42 and 43 are inserted through holes 47 and 48 of a print circuit board 46 and then are soldered to the print circuit board 46.

A silver-lead (silver 7 wt.%) wire is used as low melting point metal wire 49. When a continuous overvoltage or overcurrent flows to this surge absorber, the low melting point metal wire 49 melts (blows) from the abnormal heating of surge absorbing element 14. This cuts the continuous current from flowing to the surge absorbing element and then the abnormal heating stops.

However, a problem with the above surge absorber is that the surge absorber must be changed for a new one due to the melting of the solder connecting the lead pins to the print circuit board after the low melting point solder blows and changing the surge absorber is troublesome. Another problem with this surge absorber is that it requires a sufficient amount of space to locate the low melting point metal wire close enough to the surge absorbing element so as to assure that it rapidly blows, and also needs a relatively wide space between the surge absorbing element and the inner wall of the casing to prevent a thermal modification of the casing due to the abnormal heating of the surge absorbing element. As a result, it is difficult to miniaturize the surge absorber.

SUMMARY OF THE INVENTION

An object of this invention is to provide a miniaturized surge absorber comprising a surge absorbing element used for suppressing instantaneous surge voltages and devices used for preventing an abnormal heating of the surge absorbing element when it is subjected to continuous overvoltages or overcurrent and thereby preventing fire or thermal damage to electronic devices surrounding the surge absorber.

It is a further object of the invention to provide a surge absorber which is easily removable and/or replaceable from a circuit board to which it is normally attached so that it can easily be exchanged for a new one after the surge absorber becomes non-functional due to blowing.

These objects are achieved by the inventive surge absorber which comprises a surge absorbing element serially connected between first and second wire means for electrically connecting the surge absorbing element across the input lines of an electronic device. The first and second wire means are connected to the surge absorber by conductive heat releasable means, for example, a low melting point solder. The second wire means includes a spring loaded member which, on release of the first wire member by the first heat releasable means, e.g., by melting of the solder due to heat generated by the surge absorbing element, urges the surge absorbing element away from the first wire means. Thus, when heat is generated by the surge absorber, for example, when a relatively large current at an overvoltage flows to the surge absorber, the first wire means is blown by the heat. Also, when a relatively small current at an overvoltage flows to the surge absorber, the heat releasable means connecting the first wire means melts due to the abnormal heating of the surge absorbing element. The surge absorbing element immediately moves away from the first wire means due to the spring elasticity of the spring loaded member.

Similarly, if instead, the second heat releasable means releases the second wire means, the spring-loaded member is released and restored to a non-spring loaded state. This also serves to disconnect the surge absorbing element from the circuit.

The inventive surge absorber can be encased in a housing, usually, an insulating housing, having connecting means for releasably attaching the housing to a base or circuit board. This allows for easy removal of the surge absorber after it has become disabled due being blown from overheating as well as easy replacement with a new surge absorber.

In the present specification, the term an "overvoltage" or "overcurrent" shall mean an abnormal voltage above the discharge starting voltage of a surge absorbing element or a current accompanied by the abnormal voltage.

DESCRIPTION OF THE PREFERRED EMBODIMENT

Surge absorbing element suitable for use in this invention include microgap type surge absorbers and air gap type surge absorbers. A typical microgap type surge absorber is disclosed in U.S. patent application Ser. No. 07/798,531. Conductive heat releasable means suitable for use in the invention include metals having a low melting point, e.g., eutectic solders and other solders having low melting points. The wire means may include fine phosphoric bronze wires and other fine metal wires having low melting points.

Figure 1:
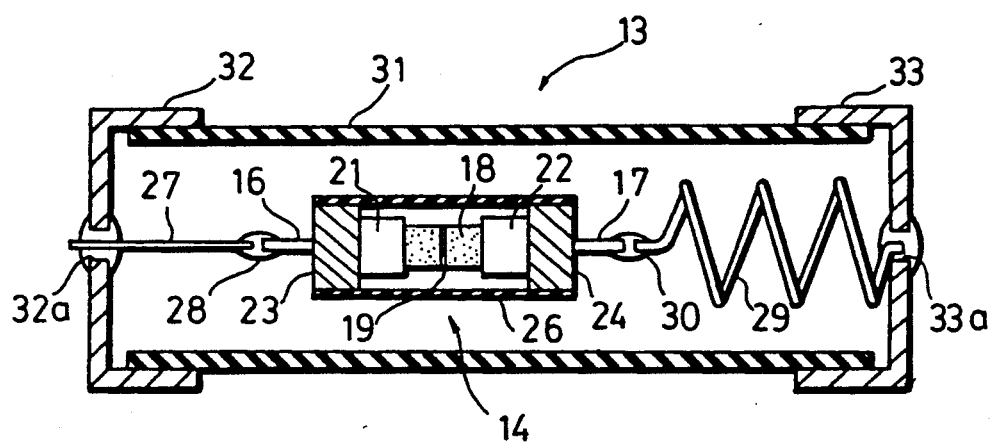
FIG. 1 is a sectional view of an embodiment of the invention.
Figure 2:
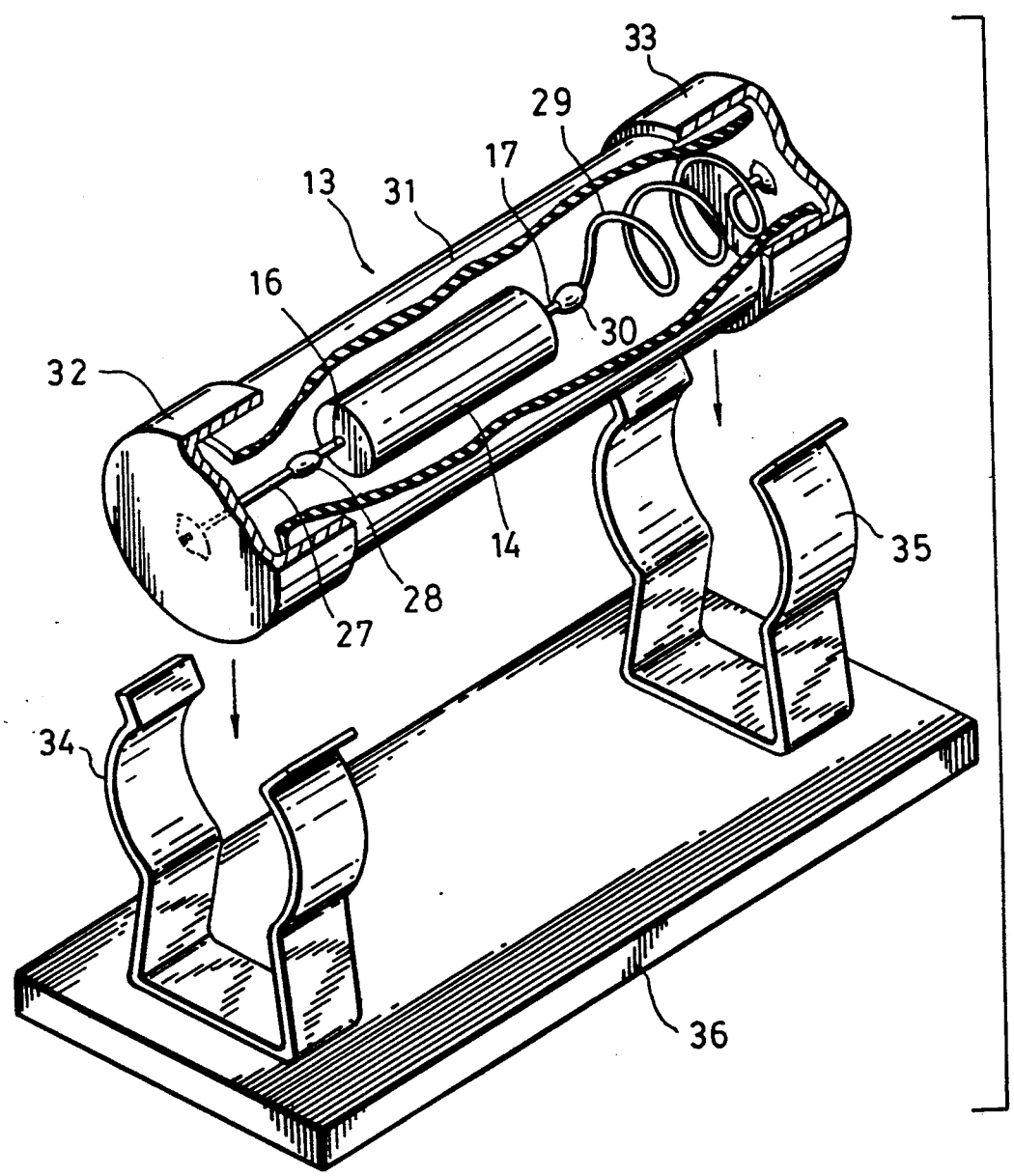
FIG. 2 is a perspective view of the embodiment shown in FIG. 1.
Figure 4:
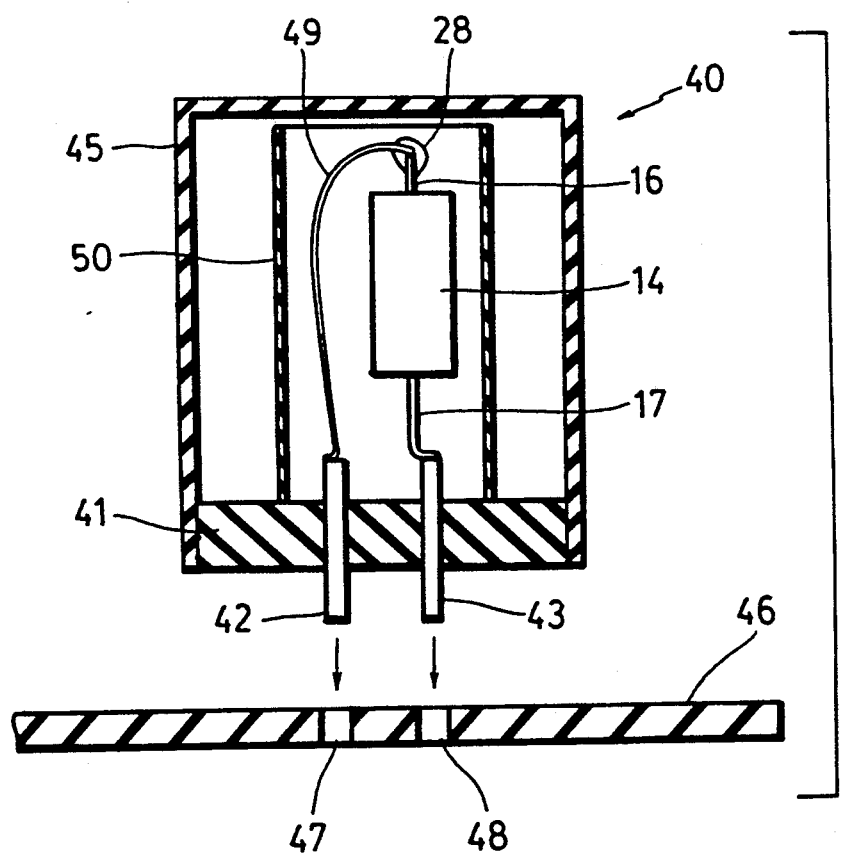
FIG. 4 is a sectional view of a prior art surge absorber.

Referring to FIGS. 1 and 2, a sectional view and perspective view of a surge absorber of this invention are shown, respectively.

A surge absorbing element 14 used in the depicted surge absorber 13 has two lead wires 16 and 17. It is a microgap type surge absorber having a discharge starting voltage of 300 volts. It is manufactured by forming microgaps 19 having a width of several tens of microns which are perpendicular to a columnar ceramic element 18, the surface of which is coated with a conductive thin film. Two cap electrodes, 21 and 22, are attached to both ends of the columnar ceramic element 18. The assembly of columnar ceramic element 18 and cap electrodes 21 and 22 is encased within a glass tube 26 and held in place by a pair of metal endplugs 23 and 24 which serve to provide a gas-tight seal at each end of glass tube 26. The tube is filled with an inert gas and two lead wires 16 and 17 are welded to the respective ends of metal plugs 23 and 24.

The surge absorber is manufactured by the following steps:

1. Lead wire 16 is soldered to one end of a fine phosphoric bronze wire 27 having a diameter of 0.15 mm and melting point of 910° C. by a eutectic solder having a melting point of 183° C. The lead wire 17 is soldered to one end of a coil spring 29 of a phosphoric bronze wire having a diameter of 0.3 mm by a eutectic solder 30 having a melting point of 183° C.;

2. The fine metal wire 27, the surge absorbing element 14 and the coil spring 29 are positioned linearly and inserted into a lead glass tube 31 having a diameter of 5 mm and a length of 20 mm;

3. The other end of the coil spring 29 is soldered to a center hole 33a of a metal cap 33 by a eutectic solder having a melting point of 183° C. The free end of fine metal wire 27 is placed through a center hole 32a of metal cap 32, and both ends of the glass tube 31 are inserted into the metal caps 32 and 33;

4. The free end of fine metal wire 27 which traverses center hole 32a is pulled to stretch coil spring 29 and place it, and, in turn, wire 27 and surge absorbing element under spring load. The free end of metal wire is then soldered to the center hole 32a with a eutectic solder having a melting point of 183° C.

Metal caps 32 and 33, make it easy to put in or take off the inventive surge protector from clip holders 34 and 35 of a base plate 36.

Figure 3:
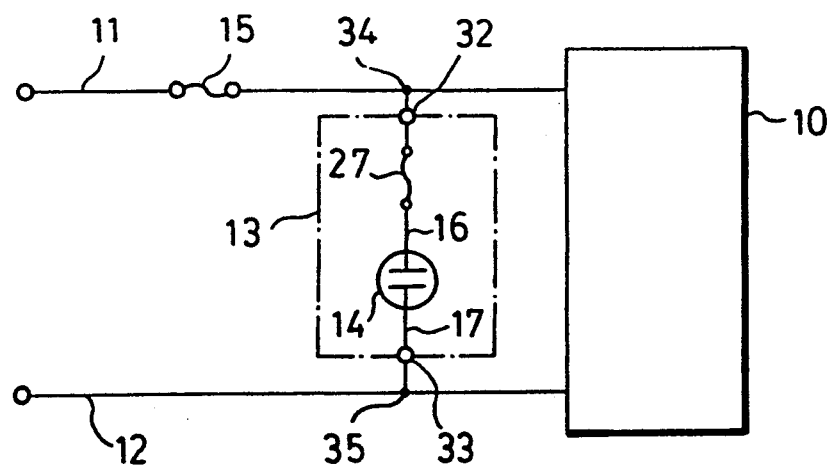
FIG. 3 is an electric circuit diagram including the embodiment shown in FIG. 1.

FIG. 3 is a circuit diagram of the surge absorber shown in FIGS. 1 and 2. As shown, the surge absorber 13 is parallel connected to, i.e., across, an electronic device 10 to be protected through a pair of input lines 11 and 12. A fuse 15 is series connected between a part of the input line 11 and the cap holder 34 to prevent continuous overvoltages or overcurrents from being applied to the electronic device 10.

A fine electric current at an overvoltage, i.e, an electric current of 0.25 amperes at AC 600 volts, is passed to input lines 11 and 12. After 4 seconds from starting the current flowing, solder 28 is blown (melted) by the heat generated by surge absorbing element 14 and the current flow to surge absorber element 14 is stopped. As a damage.

In another example, a small electric current at an overvoltage, i.e, an electric current of 2.2 A at AC 600 volts, is introduced to input lines 11 and 12 of the circuit shown in FIG. 3. After 2 seconds from starting the current flowing, solder 28 is blown by the heat generated by the surge absorbing element 14 and the current flowing to the surge absorber element 14 is cut off. As a result, electronic device 10 does not suffer any thermal damage.

In each of the above cases, the surge absorber having the blown solder connection can be easily removed from the cap holders 34 and 35, and a new surge absorber can be easily attached thereto. Also, because of the linearity, the inventive surge absorber 13 has a relatively small size, i.e., a diameter of 5 mm and a length of approximately 20 mm, as compared to that of prior art surge absorbers. Thus, it can be used to mount various devices on a print circuit board in close proximity to one another.

What is claimed is:

1. A surge absorber comprising:
   a) a surge absorbing element;
   b) first and second wire means for electrically connecting the surge absorbing element across the input lines of an electronic device, the surge absorbing element being serially connected between the first and second wire means by first and second conductive heat releasable means, respectively;
   the second wire means comprising a spring loaded member;
   wherein on release of the first or second wire means by the first or second heat releasable means, the connection between the surge absorbing element and the input lines is disrupted; and
   wherein the assembly of the surge absorbing element and the first and second wire means is enclosed in a housing of an insulating material, and the first and second wire means extend exterior of the housing to provide connection therefore with the input lines of the electronic device.

2. The surge absorber of claim 1 wherein the housing has means for releasably securing the surge absorber to a base plate.

3. The surge absorber of claim 2 wherein the housing is a cylindrical tube having endcaps thereon, the endcaps being adaptable for releasable securement to clip means of a base plate.

4. The surge absorber of claim 3 wherein the tue is made from glass, the tube and the end caps form a gas tight enclosure for the assembly, and the interior of the housing is filled with an inert gas.

* * * * *